United States Patent
Zakharia

Patent Number: 5,946,003
Date of Patent: Aug. 31, 1999

[54] METHOD AND APPARATUS FOR INCREASING OBJECT READ-BACK PERFORMANCE IN A RASTERIZER MACHINE

[75] Inventor: Khaled Zakharia, Fort Collins, Colo.

[73] Assignee: Hewlett Packard Co, Palo Alto, Calif.

[21] Appl. No.: 08/868,637

[22] Filed: Jun. 2, 1997

[51] Int. Cl.$^6$ .................................................. G06F 15/00
[52] U.S. Cl. ..................... 345/501; 345/502; 345/520; 345/522; 345/430; 345/425
[58] Field of Search .................... 345/425, 430, 345/519, 501, 502, 515–516, 522, 523, 520; 395/383; 711/213

[56] References Cited

U.S. PATENT DOCUMENTS

| | | | |
|---|---|---|---|
| 4,890,260 | 12/1989 | Chuang et al. | 365/49 |
| 5,515,521 | 5/1996 | Whitted, III et al. | 711/213 |
| 5,706,481 | 1/1998 | Hannah et al. | 345/519 |
| 5,751,292 | 5/1998 | Emmot | 345/430 |
| 5,757,374 | 5/1998 | Nakamura et al. | 345/425 |

*Primary Examiner*—Kee M. Tung
*Assistant Examiner*—Sy D. Luu

[57] ABSTRACT

The present invention relates to a method and apparatus for rasterizing images in a computer graphics display system to provide increased read-back performance. In a texel rasterizer of the computer graphics display system, a single bus is used for communicating immediate mode commands and data and variable mode commands and data. Object read commands, which are variable mode commands, are used to read objects from cache and return them to the front end component of the texel rasterizer. Object read commands are issued and completed in approximately 40 states, although the exact amount of time required to perform the transaction cannot be ascertained. Timing signals generated within the texel rasterizer allow the front end component of the texel rasterizer to prefetch objects from cache and to keep track of the number of object commands which have been issued which have not yet been completed. When an object command is issued from the front end component to a tiler component of the texel rasterizer, a signal is output by the front end component to the tiler component which indicates that a valid object read command has been issued to the tiler. When a valid object is returned to the front end component by the interpolator of the texel rasterizer, a signal is output from the interpolator to the front end component indicating that a valid object has been returned.

18 Claims, 6 Drawing Sheets

METHOD AND APPARATUS FOR INCREASING OBJECT READ-BACK PERFORMANCE IN A RASTERIZER MACHINE

TECHNICAL FIELD OF THE INVENTION

The present invention generally relates to a method and apparatus for increasing object read-back performance in a rasterizer machine. More particularly, the present invention relates to a cache-based texel rasterizer of a computer graphics display system which utilizes a single bus for writing register commands and reading back register data as well as for issuing object commands and reading back object data.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer defines the primitive in terms of the X, Y and Z coordinates of each of its three vertices, the normals of the vertices, $N_x$, $N_y$ and $N_z$, and the red, green, blue and alpha (R, G, B and $\alpha$) color values of each vertex. Alpha is a transparency value. Rendering hardware interpolates all of this data to compute the display screen pixels that represent each primitive, and the R, G, B and $\alpha$ values for each pixel.

Additionally, the primitives may also be defined in terms of texture by using texture mapping when rendering images. Texture mapping allows different parts of an object being rendered to have different appearances, such as when it is necessary or desirable to render an object which is comprised of several composite features, such as a brick wall comprised of several bricks. Rather than drawing each brick individually, a wall can be drawn and then a brick wall texture can be mapped onto the wall. Texture coordinates are usually referred to as the s, t, r and q coordinates in computer graphics display systems.

A typical graphics machine of a computer graphics display system includes a geometry accelerator, a rasterizer, a frame buffer controller and a frame buffer. Texture mapping occurs in the rasterizer, which performs pixel rasterization and texel rasterization to render a texture-mapped image on the display. The geometry accelerator receives three-dimensional vertex data from the host CPU in terms of red, green, blue and alpha (R, G, B and a) data, X Y, and Z data, $N_x$, $N_y$ and $N_z$ data, and s, t, r and q data for each primitive received by the geometry accelerator. The X, Y and Z coordinates define the locations of the vertices of the primitives on the display screen whereas the $N_x$, $N_y$ and $N_z$ data define the directions of the normals of the vertices of the primitives. The geometry accelerator processes all this data and outputs new R, G and B data for each vertex to the rasterizer. Once the rasterizer receives the R, G, B data and the s, t, r and q data for the vertices, the rasterizer performs texture mapping and rasterizes the texture-mapped image. When the image to be rendered is two-dimensional, the information defining the image can be sent directly to the rasterizer without first being sent to the geometry accelerator.

Rasterizers capable of performing texture mapping generally comprise a texel rasterizing component and a pixel rasterizing component. These two components operate in parallel and are synchronized such that, as the pixel rasterizing component determines the location of a pixel on the screen, the texel rasterizing component determines the texture to be assigned to the particular pixel and outputs it to the pixel rasterizing component which maps it onto the particular pixel. For example, as the pixel rasterizing component determines the location of a pixel on the screen corresponding to a corner of a floor being rendered, the texel rasterizing component may determine the texture of a carpet to be mapped onto the pixel.

Within the texel rasterizing component, texture information and commands are received from the host CPU and processed to generate a texel which is output to the pixel rasterizing component. A front end component receives information sent to the texel rasterizer and decodes the information into information suitable for use by the texel rasterizer. The decoded information is then sent to various components in the texel rasterizer. The information is in the form of register commands and register data and object commands and object data. Generally, four different types of commands are issued by the front end component. These commands include register write commands, register read commands, object write commands and object read commands. These commands are issued on the unbuffered path, which is a bus having a width of a certain number of bits.

Of these commands, the register read command, the register write command and the object write commands are immediate mode commands. Immediate mode commands are those which take a fixed, or predetermined, amount of time from the time that the command is issued to the time the command has been completed. The immediate mode commands can be pipelined to increase performance since the amount of time required to issue and execute a command is known. Pipelining involves issuing new commands before data corresponding to commands previously issued has been returned to the command issuer. Since with immediate mode commands the duration of the command cycle is known, pipelining can be utilized because the front end knows which command corresponds to the returned data.

The object read command, however, is a variable mode command in that the amount of time from the time the command is issued to the time the data is read from cache and returned to the front end component is variable, or indeterminate. Generally, this object read cycle has a duration of approximately 40 states, although the exact duration is not known. One known solution to the variable mode problem is for the front end component to issue an object read command and wait until the data associated with the command has been returned to the front end component before issuing the next object read command. One major disadvantage to this method is that the latency from the time each object command is issued to the time the data returns back to the front end is approximately 40 states and currently object prefetching and pipelining are not being used to reduce this latency. Prefetching involves issuing several commands in advance even though many of these commands may not be executed and will later be discarded. Generally, prefetching is not implemented for immediate mode commands because it is unnecessary to use prefetching since those commands are issued and completed very quickly.

Another known solution to this variable mode problem is to use separate buses for the variable mode and immediate mode commands and data. By using two separate buses, pipelining has been implemented for the immediate mode commands and data, while prefetching and pipelining have been used for the variable mode commands and data. A disadvantage to using two separate buses is that the two buses and their associated logic circuits take up a large amount of space and increase costs. The bus for handling the variable mode commands and data may be, for example, forty bits wide whereas the bus for handling the immediate mode commands and data may be, for example, 70 bits wide. Therefore, a separate bus for the variable mode protocol would require an additional 40 lines.

Accordingly, a need exists for a method and apparatus which allows the variable mode commands and data and the immediate mode commands and data to be handled by a single bus while also increasing object read back performance by pipelining immediate and variable mode commands while also prefetching object read commands.

SUMMARY OF THE INVENTION

The present invention provides a method and apparatus for rasterizing images in a computer graphics display system. The present invention comprises a texel rasterizer having a front end component which receives commands and data from an I/O bus and which outputs commands and data to various components within the texel rasterizer. A buffered, or rendering, path is provided in the texel rasterizer for processing texture information into a reference which is used to address a memory device in the texel rasterizer to obtain objects from the memory device. An unbuffered path is also provided in the texel rasterizer for sending commands and data to the various components of the texel rasterizer. The unbuffered path is comprised as an internal bus of the texel rasterizer. In accordance with the present invention, the internal bus is used for communicating both immediate mode commands and data as well as for communicating variable mode commands and data. During an object read cycle, object read commands are prefetched and pipelined to enhance read-back performance. Signals within the texel rasterizer allow the front end component to keep track of the number of object read commands which have been issued and the number of objects which have been returned to the front end component. In addition to issuing multiple object read commands to perform prefetching, object read commands and an end command are sent to the front end component over the I/O bus. Objects found in a read back FIFO of the front end component after the end command is received by the front end component are flushed, or discarded, because these correspond to commands which were prefetched but which were never sent to the front end component over the I/O bus.

In accordance with the preferred embodiment of the present invention, the texel rasterizer of the present invention comprises a front end component, an edge stepper, a span stepper, a rational linear interpolator, a tiler, a directory, a cache memory device, an interpolator, a content addressable memory (CAM) device interfacing the cache memory device with the interpolator, and an internal bus for providing an unbuffered path for communication of commands and data within the texel rasterizer. The internal bus preferably is connected to front end component, the edge stepper, the tiler, the directory, and the interpolator. The path along the internal bus from the front end component to the tiler, to the directory provides the object command path within the texel rasterizer. The path from the CAM to the interpolator to the front end component provides the object data return path for returning objects retrieved from cache to the front end component.

In accordance with the preferred embodiment of the present invention, a set of signals provided from the front end component to the other components of the texel rasterizer via the internal bus defines an object read cycle during which valid object read commands can be issued by the front end component to the tiler. When a valid object read command has been issued by the front end component to the tiler, a first signal output onto the internal bus from the front end component to the tiler indicates that a valid object read command has been issued. When a valid object has been returned by the interpolator to the front end component via the internal bus, a second signal is output over the internal bus from the interpolator to the front end component indicating that a valid object has been returned to the front end component. The front end component uses these signals to determine the number of issued object commands and the number of returned object data. The front end component receives object read commands and an end command from the I/O bus. In order to perform prefetching, the front end component issues multiple object read commands to the tiler in response to receiving single object read command from the I/O bus. A signal provided from the CAM to the front end component indicates when all of the issued commands have been completed. When the front end component receives an end command, all of the objects found in the read back FIFO of the front end component after the end command was received are flushed. The signal from the CAM indicates when the data from all of the issued object commands have been returned.

DETAILED DESCRIPTION OF THE INVENTION

Figure 1:
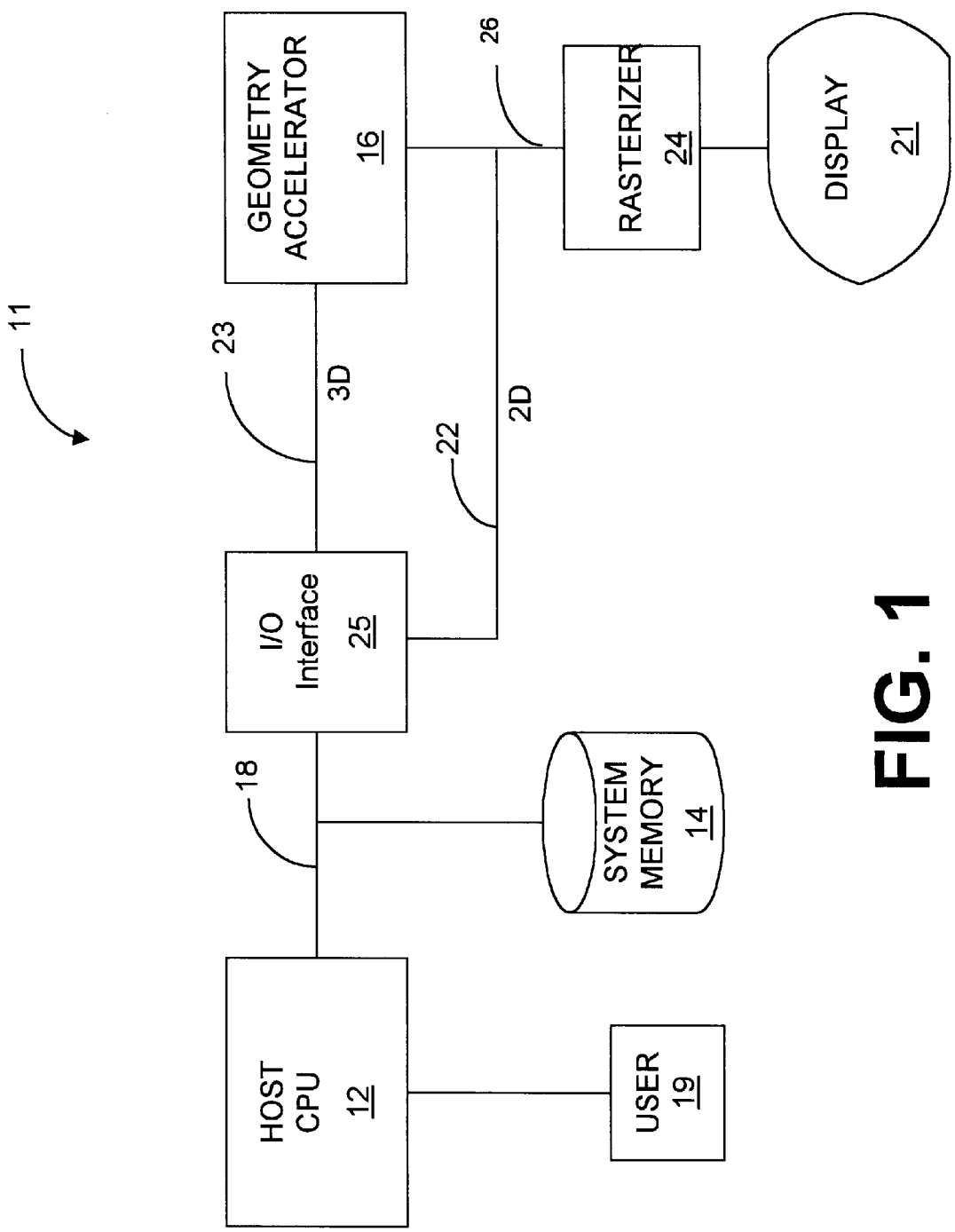
FIG. 1 illustrates a functional block diagram of a known computer graphics display system.

The basic components of a known computer graphics display system are shown in FIG. 1. The computer graphics display system 11 comprises a CPU 12, system memory 14, a display device 21, a geometry accelerator 16, a rasterizer 24 and an I/O interface 25, which connects the geometry accelerator 16 and rasterizer 24 with the host CPU 12. The CPU 12 communicates with the geometry accelerator 16, the rasterizer 24 and system memory 14 via I/O bus 18. The I/O interface 25 is connected to the rasterizer 24 and to geometry accelerator 16 via I/O lines 22 and 23, respectively. When the data output to the graphics hardware is 2-D data, it is sent directly to the rasterizer 24. When the data output to the graphics hardware is 3-D data, it is sent to the geometry accelerator 16 and then to the rasterizer 24. The data is sent from the geometry accelerator 16 to the rasterizer 24 via bus 26. A user 19 communicates with the CPU 12 via a peripheral device, such as a keyboard or mouse, to indirectly control the data being sent to the geometry accelerator 16, thereby controlling the rendering of the image being displayed on the display device 21.

Figure 2:
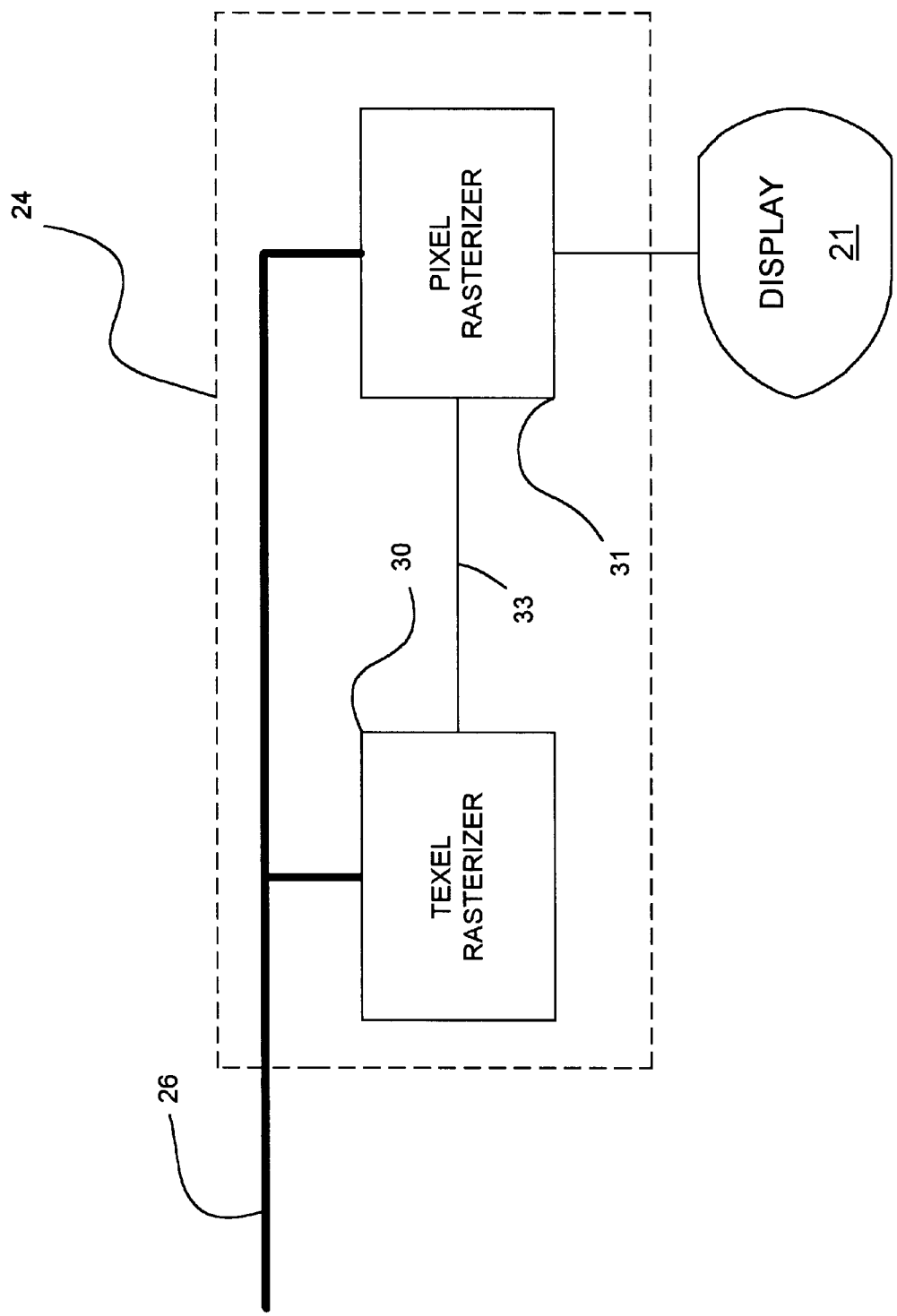
FIG. 2 illustrates a functional block diagram of the general components of a rasterizer of the computer graphics display system shown in FIG. 1.

FIG. 2 illustrates a block diagram of rasterizer 24 shown in FIG. 1. Rasterizer 24 is comprised of a texel rasterizing component 30 and a pixel rasterizing component 31. The output of the texel rasterizing component 30 is input to the pixel rasterizing component 31 via line 33. The output of the pixel rasterizing component is connected to display 21. When the information being sent to the rasterizer 24 is 2-D information, the information is sent via bus 22 to both the texel rasterizer 30 and to the pixel rasterizer 31. When the information being sent to the rasterizer 24 is 3-D information, the information is sent to the geometry accelerator 16 via bus 23 and then to both the texel rasterizer 30 and to the pixel rasterizer 31 via bus 26. The operations of the pixel rasterizer 31 are well known in the art and, therefore, will not be discussed here in the interest of brevity.

Figure 3:
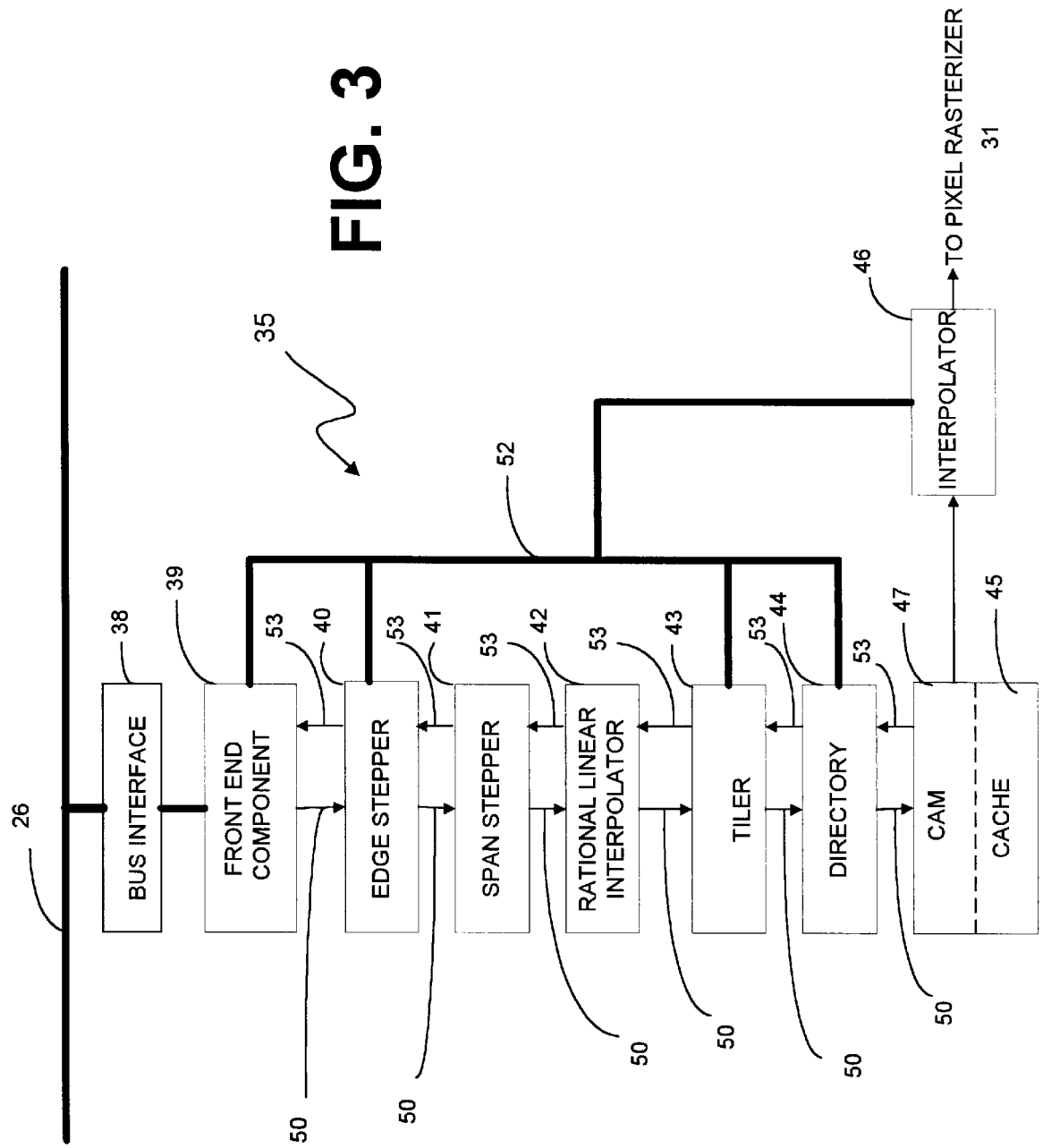
FIG. 3 illustrates a functional block diagram of the texel rasterizing component of the present invention.

The components of the texel rasterizer of the present invention will now be discussed in detail with reference to FIG. 3. The bus interface 38 receives commands and data being sent to the texel rasterizer 35 on bus 26 and stores the data and commands to be processed by texel rasterizer 35 in front end component 39. Front end component 39 is comprised of a buffered write first-in-first-out (FIFO) memory device (not shown), a buffered read FIFO memory device (not shown), an unbuffered write FIFO memory device (not shown) and an unbuffered read FIFO memory device (not shown). The buffered write and read FIFOs are comprised as part of the buffered, or rendering, path 50 of the texel rasterizer 30 and the unbuffered read and write FIFOs are comprised as part of the unbuffered path 53 of the texel rasterizer 30. The buffered and unbuffered write FIFOs store information written to the front end component 39 by the bus interface 38. The buffered and unbuffered read FIFOs store information to be read by the bus interface 38 and processed by the bus interface 38 and output onto bus 26.

The buffered path 50 is used for processing texture information to generate texels which will eventually be output to a pixel rasterizer which maps them onto pixels. The operations of the components of the texel rasterizer 35 along the buffered path 50 are as follows. The edge stepper 40 and the span stepper 41 within the texel rasterizer 35 rasterize the image and determine the s, t, r and q coordinates of each texel to be mapped and output this information via the buffered path 50 into a rational linear interpolator 42 which applies a correction to the texel values to obtain a correct perspective view. This information is then output via the buffered path 50 to a tiler 43. The tiler 43 performs mathematical calculations on the texture information sent by the host CPU 12 (FIG. 1) to the texel rasterizer 35 to generate virtual addresses relating to the locations in cache 45 where the texture data corresponding to the texture to be mapped is stored.

The output of the tiler 43 is input via the buffered path 50 into a directory component 44 which uses the virtual addresses to reference cache 45 to determine whether texture mapping information corresponding to the virtual addresses is contained in cache 45. If not, the directory 44 suspends processing along the buffered path 50 and informs the front end component 39 via the unbuffered path 52 that the information sought is not in cache 45. The front end component 39 then informs the host CPU 12 that the information sought is to be downloaded by the host CPU 12 into cache 45. The host CPU 12 then downloads the texture information to the front end component 39 which downloads it into cache 45 via the unbuffered path 52. The processing of the information along the buffered path 50 is then resumed and the texture information which was loaded into cache 45 is output to an interpolator 46 which blends the different texels from the cache 45 into a composite texel based on a fractional component of the texels. The composite texel is then output to the pixel rasterizing component 31 (FIG. 2) of the computer graphics display system 11 (FIG. 1) which maps the texels onto the pixels. A content addressable memory (CAM) 47 provides an interface between cache 45 and interpolator 46.

Generally, the unbuffered path, which is bus 52, is used for carrying unbuffered and buffered register commands and data and object commands and data. The front end component 39 receives information from the bus interface 38, decodes the information and decides where to send the information. The front end component 39 also receives information sent to it from within the texel rasterizer 35 via bus 52 and outputs it to bus interface 38. In accordance with the present invention, bus 52 communicates immediate mode and variable mode commands and data to and from the components of the texel rasterizer 30. Preferably, bus 52 is 70 bits wide, with 31 bits being allocated for addresses, 32 bits being allocated for data, and the remainder of the bits being allocated for various control signals. Bus 52 can be driven by any one of several components of texel rasterizer 35.

In accordance with the present invention, it has been determined that a single bus 52 can be used for communicating both immediate mode and variable mode commands and data within the texel rasterizer 35. The immediate mode commands include register read and register write commands and object write commands. The variable mode commands include object read commands. Register read and write commands are used to write data to or read data from a register in one of the components of the texel rasterizer 30 other than cache 45. All of these commands are issued from the front end component 39 and sent to one of the other components in texel rasterizer 35. Register read and write commands can be issued to the edge stepper 40, the tiler 43, the directory 44 and the interpolator 46. Object read and write commands are sent to the tiler 43.

A register write command contains the address of the register to which data is being written and the data to be written to the register. In accordance with the preferred embodiment of the present invention, the address is the least significant 12 bits of the 31 bit address field and the data is 32 bits. The entire register write transaction occurs in one state. A register read command contains the 12 bit address of the register being read. For register read commands, two states occur from the time the command is issued to the time that the data is received back at the front end component 39.

An object write command is similar to a register write command except that object write commands are used to write data to cache 45 as opposed to writing data to one of the other components of the texel rasterizer 35. Objects correspond to texel information to be written to or read from addresses in cache 45. An object write command, as that term is used herein, comprises the address to which the data is to be written in cache 45 and the data to be written to the address. The entire object write transaction occurs in one state.

Figure 4:
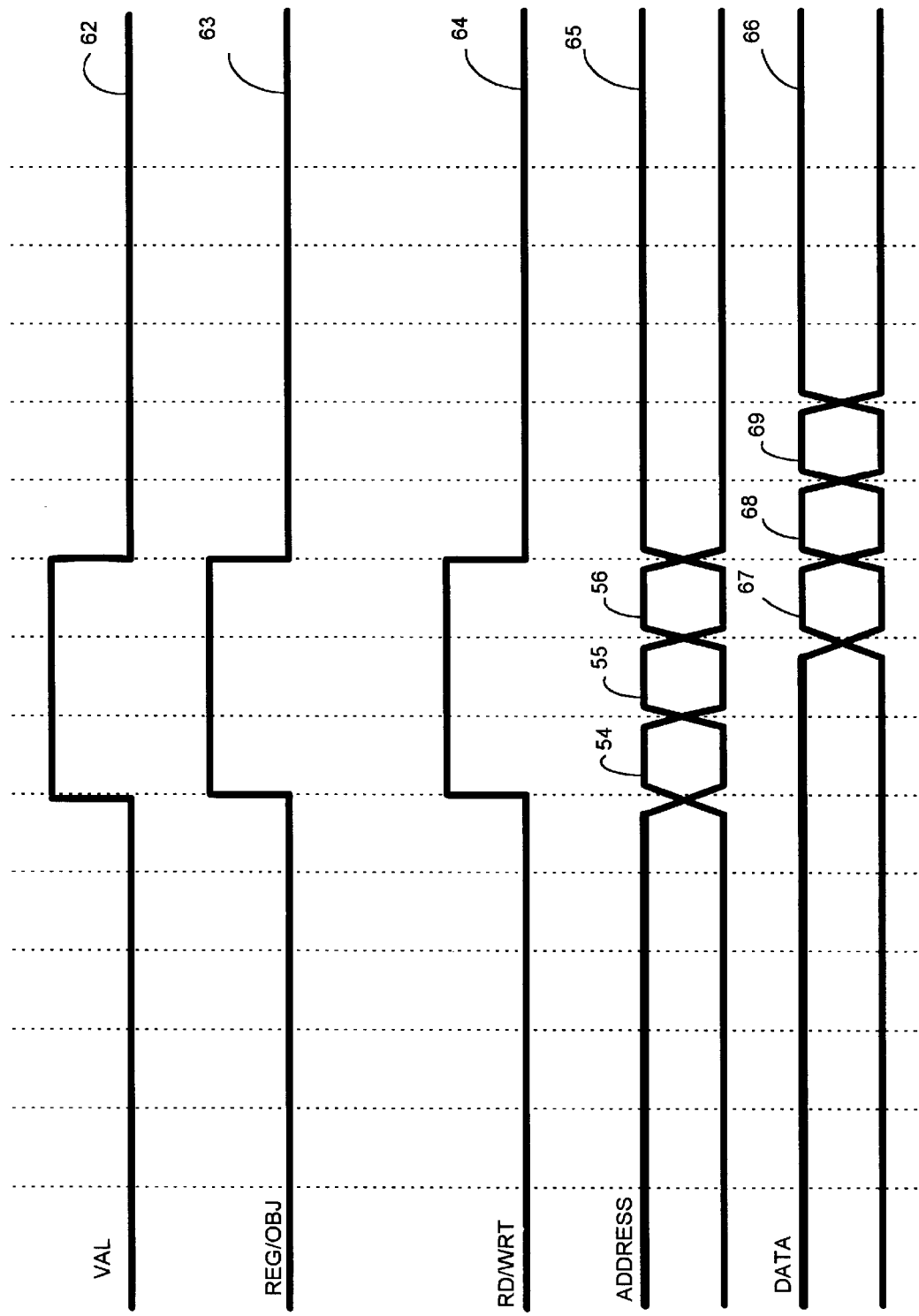
FIG. 4 is a timing diagram illustrating the timing of a register read transaction occurring within the texel rasterizing component shown in FIG. 3.

FIG. 4 is a timing diagram illustrating the timing of a register read transaction which exemplifies the manner in which immediate mode commands are handled in accordance with the present invention. For purposes of illustration, the timing diagram shows three register read transactions issued in sequence. For purposes of discussion, the space between each pair of dashed lines in FIG. 4 represents the occurrence of one state. When signals 62, 63 and 64 are all high for one state, the register designated by the address contained in data flow 65 during that state will be read. Two states later, the data read from the register will be received at front end component 39.

Each of the signals 62, 63 and 64 serves a different purpose. Signal 64 indicates whether the transaction is a register read transaction or a register write transaction. When signal 64 is high, this indicates that a register read transaction is taking place. When signal 64 is low, this indicates that a register write transaction is taking place. Signal 63 indicates whether a register transaction or an object transaction is occurring. When signal 63 is high, this indicates that a register transaction is occurring. When signal 63 is low, this indicates that an object transaction is taking place. Signal 62 is a validity signal. The only time any command issued by the front end component 39 will be executed is when the validity signal 62 is in the high state. For example, if during any one state signals 63 and 64 are both high, indicating that a register read transaction is taking place, the transaction will not take place if the validity signal 62 is low.

Signal 65 indicates the address to which the command is directed. Address blocks 54, 55 and 56 of signal 65 each may designate a different register address or the same register address. Thus, block 54 may designate a first address at which the first register read is to occur, block 55 may designate a second address at which the second register read is to occur, and block 56 may designate a third address at which the third register read is to occur. Blocks 54, 55 and 56 may also designate the same address such that all three register reads shown occur successively at the same register.

Signal 66 represents data which has been read from one of the registers and which is sent to the front end component 39. Data blocks 67, 68 and 69 of signal 66 indicate that the different components of texel rasterizer 35 which are connected to bus 52 may be driving bus 52. The bus 52 can be driven by either the front end component 39, the edge stepper 40, the tiler 43, the directory 44 or the interpolator 46. These components in conjunction with bus 52 provide a path for the continuous flow of commands and data through texel rasterizer 35. All of the signals discussed above are carried on bus 52.

Figure 5:
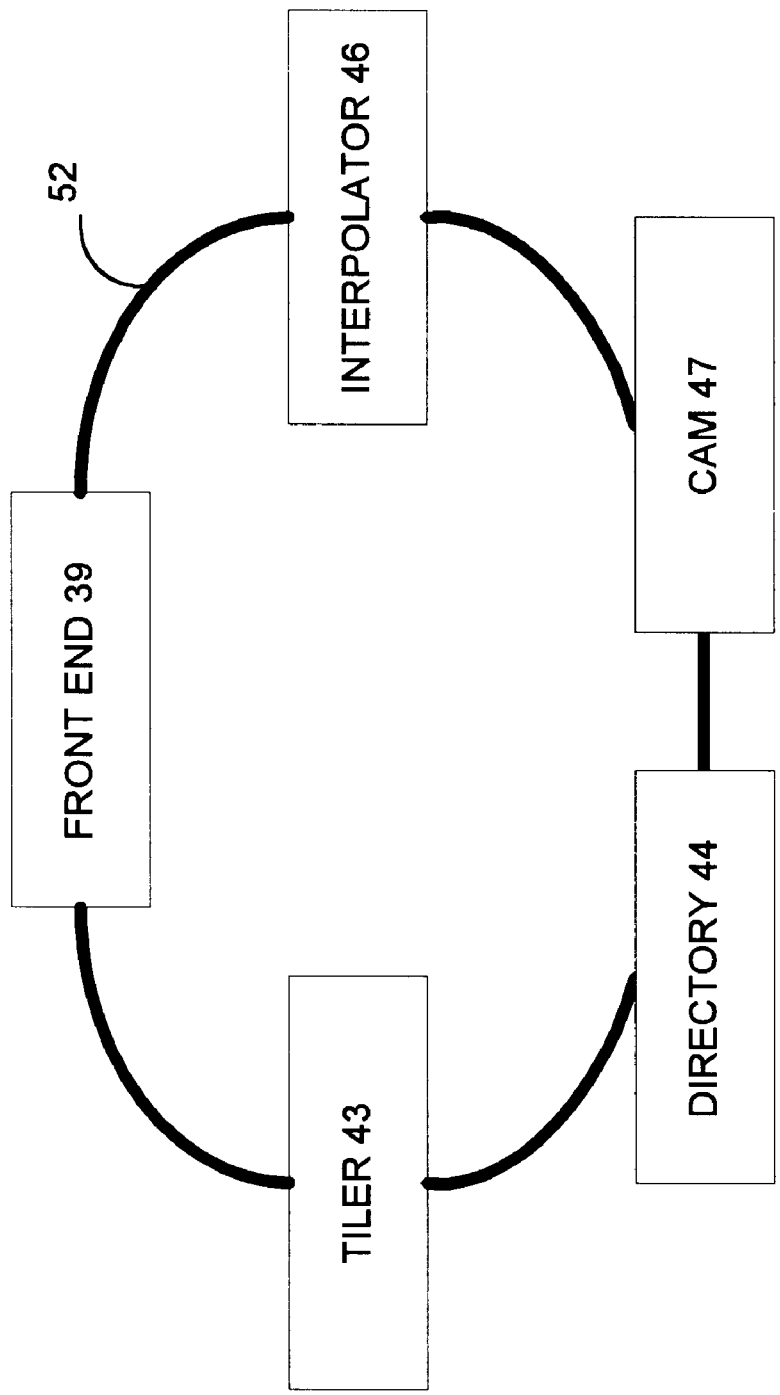
FIG. 5 illustrates a functional block diagram of the object command path and the object data return path through the texel rasterizer of FIG. 3.

FIG. 5 illustrates a functional block diagram of the components which form the object command path and the object data return path in accordance with the preferred embodiment of the present invention. The object command path is from the front end component 39, to the tiler 43, to the directory 44. The object data return path is from CAM 47, to the interpolator 46 and back to the front end component 39. In accordance with the present invention, object read commands are issued by the front end component 39 simultaneously as object data is read back by the front end component 39, thereby allowing object read commands to be pipelined. This feature of the present invention greatly improves object read back performance. The manner in which this is accomplished is discussed in detail below with respect to FIG. 6. It should be noted that the present invention is not limited with respect to which components comprise the object command and object data return path. The components shown in FIG. 5 were chosen because of their positions and functions in the texel rasterizer 35.

Additionally, object read back performance is enhanced by letting the tiler 43 perform a portion of the duties which have in the past been performed by the front end component 39. Specifically, when the front end component 39 issues an object read command, it is not necessary for it to send the addresses of the locations in cache 45 which are to be read. Instead, the starting address of the read, the direction of the read, and the incremental change in address of the read are held in the tiler 43. For example, if the starting address is 0, the incremental change in the address is 2, and the direction indicates increasing addresses, the addresses accessed will be 0, 2, 4, 6, 8, etc. Therefore, by having the tiler 43 hold the aforementioned parameters, the front end component 39 only has to issue an object read command without having to send the address.

As stated above, in accordance with the present invention, a single bus 52 is used for both the immediate mode commands (register reads, register writes and object writes) and data, and for the variable mode commands (object reads) and data. The manner in which this feature of the present invention is accomplished with respect to the immediate mode commands was discussed above with reference to FIG. 4. The manner in which this feature of the present invention is accomplished for the variable mode commands will now be discussed with reference to FIGS. 3 and 6.

Figure 6:
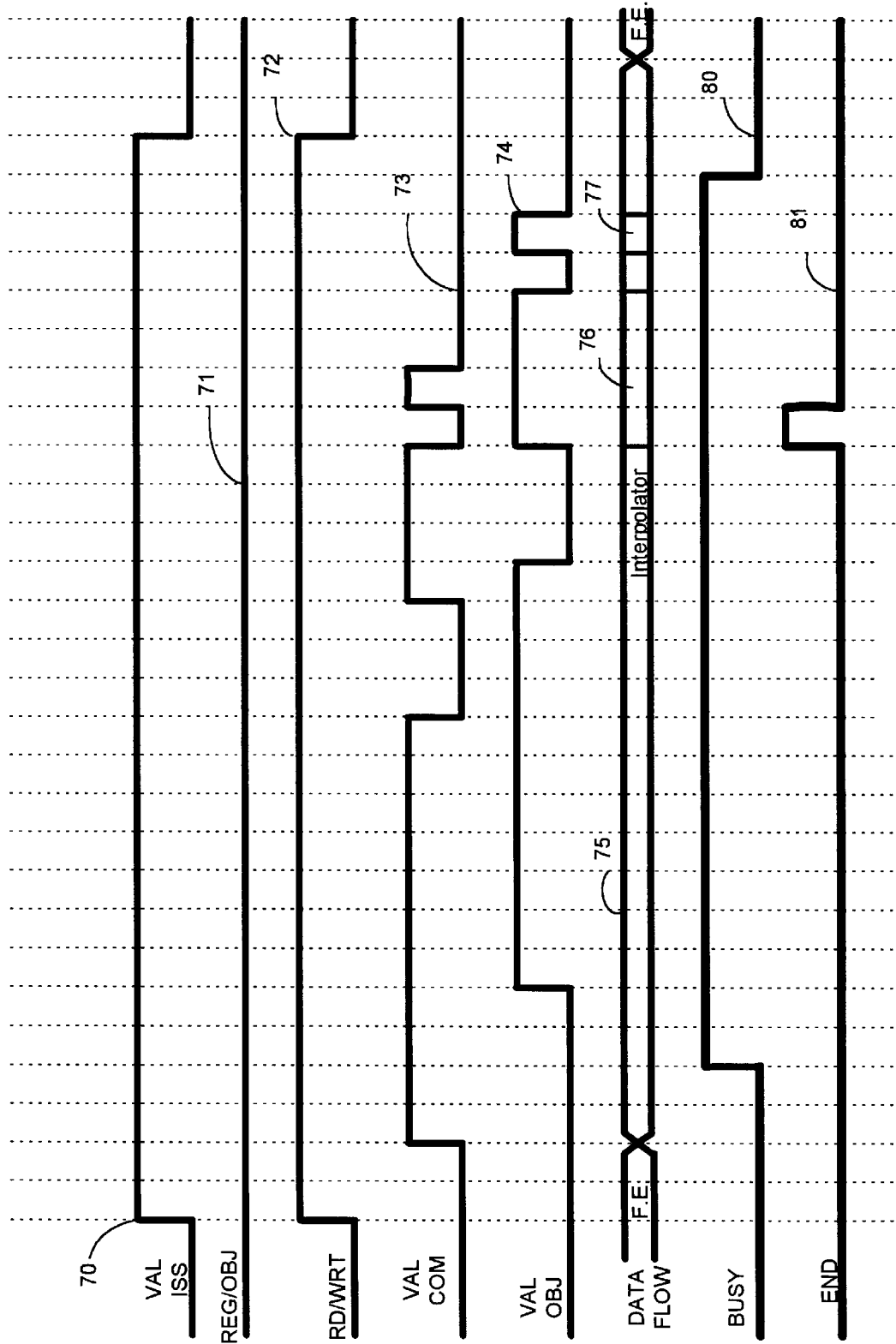
FIG. 6 is a timing diagram illustrating the timing of object read transactions within the texel rasterizing component shown in FIG. 3.

Signals 70, 71 and 72 in FIG. 6 originate in the front end component 39 and are output via bus 52 to each of the components in texel rasterizer 35. When the object read cycle begins, the interpolator 46 takes over control of bus 52 from the front end component 39 and drives the bus 52. This is indicated by data waveform 75 which corresponds to bus 52 and which indicates which component of the texel rasterizer 35 is controlling bus 52.

Signals 70, 71 and 72 together define a window of time during which object read transactions can take place. When signal 70 is high, this is an indication that a valid object read command can be issued from the front end component 39. When signal 70 is low, a valid object read command cannot be issued. When signal 71 is low, this indicates that an object command as opposed to a register command is taking place. When signal 71 is high, this indicates that a register command as opposed to an object command is taking place. In FIG. 6, signal 71 is shown in its low state, indicating that an object command is taking place. When signal 72 is high, this indicates that a read, as opposed to a write, is taking place. Therefore, since signals 70, 71 and 72 are high, low, high, respectively, this indicates that a valid object read can take place. This condition will be referred to hereinafter as the object read cycle.

Signal 73, which is generated by front end component 39 and output to tiler 43 via bus 52, indicates when an object command is being issued from the front end component 39. When signal 73 is high for one state during the object read cycle, this indicates that one valid object command has been issued from the front end component 39 to the tiler 43. When signal 73 is low, no object commands are being issued. For each state that signal 73 is high, an object command is issued from the front end component 39 to the tiler 43. The variable number of high and low states illustrated as occurring successively in signal 73 is intended to illustrate that any number of object commands can be issued successively by the front end component 39 to the tiler 43. For example, when signal 73 is high for two successive states, two object commands have been issued successively. In accordance with the preferred embodiment of the present invention, as many as 32 valid object read commands are issued successively onto bus 52. However, it should be noted that the present invention is not limited with respect to the number of object read commands which can be issued. In accordance with the preferred embodiment, the object read FIFO (not shown) comprised in front end component 39 has been designed to have a depth of 32 for storing objects as they are read back by the front end component 39. In order to ensure that the object read FIFO is not overflowed, no more than 32 object reads should be issued successively. Signal 74 is a signal provided from the interpolator 46 to the front end component 39 via bus 52. When signal 74 is high during the object read cycle, this indicates that valid object data is being returned to the front end component 39 from the interpolator 46. The front end component 39 is always prepared to accept object data, but only reads it in when signal 74 is high. When the objects are read by the front end component 39, they are stored in a read back FIFO (not shown) contained in the front end component 39. The objects stored in the read back FIFO will then be sent over bus interface 38 onto bus 26.

It can be seen from FIG. 6 that signals 73 and 74 can be high at the same time, which is intended to illustrate that object read commands can be issued by the front end component 39 at the same time that object data corresponding to previously issued object read commands is being read back by front end component 39. Signals 73 and 74 are both used by the front end component 39 to keep track of the object commands issued and the objects returned. Generally, this is accomplished by incrementing a counter (not shown) each time signal 73 goes high and by decrementing the counter each time signal 74 goes high until a net sum of zero is contained in the counter, which indicates that all of the objects have been read back. In accordance with the preferred embodiment of the present invention, the binary value in the counter should remain less than 32 to ensure that the read back FIFO (not shown) in front end component 39, which preferably has a depth of 32, is not overflowed with more objects than can be temporarily stored therein.

Signal 80 is a busy signal provided from CAM 47 to front end component 39. Signal 80 indicates that, for each object command issued by the front end component 39, objects corresponding to these commands have already been returned to the front end component 39. In accordance with the preferred embodiment of the present invention, signal 80 goes high a few states after the object cycle begins and remains high until a determination is made that there is no more processing occurring in the CAM 47 or in the interpolator 46, which means that all of the object commands which were issued have been processed.

Signal 81 is a signal provided from bus 26 to the front end component 39 via bus interface 38. This signal tells the front end component 39 not to issue any more object read commands. Signal 81 is asserted after the last object read command has been sent from bus 26 via bus interface 38 to the front end component 39. Front end component 39 issues multiple object read commands on its own in response to receiving a single object read command from the bus interface 38 to accomplish prefetching. Generally, signal 81 is used in conjunction with signal 80 to facilitate prefetching of objects by front end component 39. This is accomplished as follows. Until signal 81 is asserted, object read commands can continue to be issued by the front end component 39, provided that the net sum in the counter referred to above is less than 32. The busy signal 80 goes low, once all of the objects corresponding to the object commands already issued from the front end component 39 have been read back by the front end component 39. The front end component 39 will flush any objects which correspond to object read commands executed in excess of the number of object read commands sent from bus 26 to the front end component 39; that is, the objects found in the read back FIFO of the front end component 39 after signal 81 is asserted will be flushed. This is shown in FIG. 6 by blocks of objects 76 and 77 in data flow 75, which correspond to the time when signal 74 is high and which are flushed after signal 81 goes high.

Therefore, in accordance with the present invention, the immediate mode commands and the variable mode commands are handled by a single bus, thus decreasing the number of wires normally required to handle all of these types of commands. Additionally, object read back performance is improved by providing for prefetching and pipelining of the object read commands and data as well as for the immediate mode commands and data. It should be noted that the present invention has been described with respect to the preferred embodiments and that it is not limited to these embodiments. It will be understood by those skilled in the art that modifications can be made to the embodiments discussed above without departing from the spirit and scope of the present invention.

What is claimed is:

1. A texel rasterizer of a computer graphics display system which utilizes a single internal bus for communicating variable mode commands and immediate mode commands, the texel rasterizer comprising:

a front end component which interfaces with an input/output bus of the computer graphics display system for receiving commands and data from the input/output bus, the front end component outputting register read commands, register write commands, object read commands and object write commands over the internal bus, wherein object write commands, register write commands, and register read commands are immediate mode commands and wherein object read commands are variable mode commands;

a tiler component in communication with said front end component via the internal bus, the tiler component receiving texture information and translating the texture information into virtual address information, the tiler component receiving register read commands, register write commands, object read commands and object write commands from said front end component via the internal bus;

a directory component connected to the internal bus for receiving information from and for outputting information to the internal bus, the directory component receiving the virtual address information from the tiler component via a rendering path and generating memory references based on the virtual address information, the directory component receiving register read commands and register write commands from said front end component via the internal bus;

a first memory device in communication with the directory component via the rendering path, the first memory device being referenced by the directory component and, when the reference made by the directory component is available, the first memory device outputs texel information onto the internal bus; and an interpolator connected to the internal bus, the interpolator receiving texel information output from the first memory device and generating a composite texel, the interpolator returning objects to the front end component via the internal bus wherein the objects correspond to object read commands issued by the front end component to the tiler component, wherein a set of signals output by the front end component to the other components of the texel rasterizer via the internal bus define an object read cycle during which valid object read commands can be issued by the front end component, the front end component issuing a first signal to the tiler component via the internal bus indicating when an object read command has been issued to the tiler component, said interpolator issuing a second signal to the front end component via the internal bus indicating when a valid object has been returned from the interpolator to the front end component, wherein the front end component uses the first and second signals to determine how many of the object read commands issued by the front end component have not been completed.

2. The texel rasterizer of claim 1 further comprising:

a stepper component connected to the internal bus, the stepper component receiving register read commands and register write commands from the front end component via the internal bus, the stepper component receiving texture information from the front end component via the rendering path and rasterizing an image to generate s, t, and r coordinates; and a rational linear interpolator receiving the s, t and r coordinates generated by the stepper component and providing a correction to the coordinates to adjust for a perspective view of an image and outputting corrected texture coordinate information to the tiler component via the rendering path, wherein the corrected texture coordinate information corresponds to the texture information received by the tiler component via the rendering path.

3. The texel rasterizer of claim 1, wherein prefetching of multiple object read commands by the front end component is triggered by the front end component receiving a single object read command from the input/output bus.

4. The texel rasterizer of claim 3, wherein objects returned to the front end component after an end command signal is received by the front end component from the input/output bus are discarded.

5. The texel rasterizer of claim 3 wherein the front end component receives object read commands and an end component from the input/output bus, the end command indicating that the last object read command received by the front end component is the final object read command to be issued by the front end component, wherein objects found in the front end component after the end command is received are discarded.

6. The texel rasterizer of claim 4 further comprising a content addressable memory device for interfacing the cache memory device with the interpolator, wherein the content addressable memory device outputs a signal via the internal bus to the front end component indicating that all of the object read commands issued by the front end component have been completed, wherein objects found in the front end component after an end command signal was received by the front end component from the input/output bus are flushed.

7. The texel rasterizer of claim 1 further comprising a content addressable memory device for interfacing the cache memory device with the interpolator, wherein the content addressable memory device outputs a signal via the internal bus to the front end component indicating that all of the object read commands issued by the front end component have been completed, wherein objects found in the front end component after an end command signal was received by the front end component from the input/output bus are flushed.

8. The texel rasterizer of claim 7, wherein prior to the set of signals being issued by the front end component defining the object read cycle, the front end component drives the internal bus, and wherein a predetermined number of states after the set of signals defining the object read cycle have been issued by the front end component during the object read cycle, the interpolator drives the bus.

9. A texel rasterizer of a computer graphics display system which utilizes a single internal bus for communicating variable mode commands and immediate mode commands, the texel rasterizer comprising:

a front end component which interfaces with an input/output bus of the computer graphics display system for receiving commands and data from the input/output bus, the front end component outputting register read commands, register write commands, object read commands and object write commands over an internal bus, wherein the register write commands, the register read commands and the object write commands are immediate mode commands and the object read commands are variable mode commands;

a stepper component connected to the internal bus, the stepper component receiving register read commands and register write commands from the front end component via the internal bus, the stepper component receiving texture information from the front end component via a rendering path and rasterizing an image to generate s, t, and r coordinates;

a rational linear interpolator receiving the s, t and r coordinates generated by the stepper component and providing a correction to the coordinates to adjust for a perspective view of an image and outputting corrected texture coordinate information onto the rendering path;

a tiler component in communication with the front end component via an internal bus, the tiler component receiving the corrected texture coordinate information output from the rational linear interpolator and translating the texture coordinate information into virtual address information, the tiler component receiving register read commands, register write commands, object read commands and object write commands from the front end component via the internal bus;

a directory component connected to the internal bus which receives information from and which outputs information to the internal bus, the directory component receiving the virtual address information from the tiler component via the rendering path and generating cache references based on the virtual address information, the directory component receiving register read commands and register write commands from said front end component via the internal bus;

a first memory device in communication with the directory component via the rendering path the first memory device being referenced by the directory component and, when the reference made by the directory component is available, the first memory device outputs texel information onto the internal bus; and an interpolator connected to the internal bus, the interpolator receiving texel information output from the first memory device and generating a composite texel, the interpolator returning objects to the front end component via the internal bus, wherein the objects correspond to object read commands issued by the front end component to the tiler component, wherein a set of signals output by the front end component to the other components of the texel rasterizer via the internal bus define an object read cycle during which valid object read commands can be issued by the front end component, the front end component issuing a first signal to the tiler component via the internal bus indicating when an object read command has been issued to the tiler component, said interpolator issuing a second signal to the front end component via the internal bus indicating when a valid object has been returned from the interpolator to the front end component, wherein the front end component uses the first and second signals to determine the number of object read commands issued by the front end component and the number of objects returned to the front end component.

10. The texel rasterizer of claim 9, wherein prefetching of multiple object read commands by the front end component is triggered by the front end component receiving an object read command from the input/output bus.

11. The texel rasterizer of claim 10, wherein objects found in the front end component after an end command signal is received by the front end component from the input/output bus are discarded.

12. The texel rasterizer of claim 10 wherein the front end component receives object read commands and an end command from the input/output bus, the end command indicating that the last object read command received by the front end component is the final object read command to be issued by the front end component, wherein objects found in the front end component after the end command is received by the front end component corresponding to object read commands prefetched are discarded.

13. The texel rasterizer of claim 12 further comprising a content addressable memory device for interfacing the cache memory device with the interpolator, wherein the content addressable memory device outputs a signal via the internal bus to the front end component indicating that all of the object read commands issued by the front end component have been completed, wherein once all of the object read commands have been completed, the front end component discards any objects found in the front end component after the end command signal was received by the front end component from the input/output bus.

14. The texel rasterizer of claim 13, wherein prior to the set of signals being issued by the front end component defining the object read cycle, the front end component drives the internal bus, and wherein a predetermined number of states after the set of signals defining the object read cycle have been issued by the front end component, the interpolator drives the bus.

15. A method of performing object read commands in a texel rasterizer of a computer graphics display system, wherein object read commands, object write commands, register write commands and register read commands are communicated over a single internal bus, the method comprising the steps of:

outputting a set of signals over the internal bus of the texel rasterizer from a front end component of the texel rasterizer to a tiler component and to a directory component of the texel rasterizer, wherein the set of signals define a an object read cycle;

during the object read cycle, issuing object read commands from the front end component to the tiler component;

outputting a first signal from the front end component to the tiler component indicating when a valid object read command has been issued from the front end component to the tiler component;

outputting objects obtained from a memory device of the texel rasterizer to the front end component which correspond to object read commands issued by the front end component;

outputting a second signal from within the texel rasterizer to the front end component indicating when a valid object has been returned to the front end component; and analyzing the first and second signals to determine the number of object commands issued by the front end component and the number of objects returned to the front end component.

16. The method of claim 15, wherein the front end component receives object read commands and an end command from an input/output bus, the front end component issuing multiple object read commands during the object read cycle in response to the front end component receiving an object read command from the input/output bus, wherein once all of the object read commands issued by the front end component have been completed, objects found in the front end component after the end command was received by the front end component are discarded.

17. The method of claim 16 wherein a third signal received by the front end component from within the texel rasterizer indicates that all of the object read commands issued by the front end component have been completed.

18. A method of performing object read commands in a texel rasterizer of a computer graphics display system, wherein object read commands, object write commands, register read commands and register write commands are communicated on a single internal bus, the method comprising the steps of:

receiving object read commands and an end command from an input/output bus of the computer graphics display system in a front end component of the texel rasterizer;

outputting a set of signals over the internal bus of the texel rasterizer from a front end component of the texel rasterizer to a tiler component, to a directory component, and to an interpolator component of the texel rasterizer, wherein the set of signals define an object read cycle;

during the object read cycle, issuing object read commands from the front end component to the tiler component, the front end component issuing multiple object read commands during the object read cycle in response to receiving an object read command from the input/output bus;

outputting a first signal from the front end component to the tiler component indicating when a valid object read command has been issued from the front end component to the tiler component;

outputting objects obtained from a cache memory device of the texel rasterizer and sent to the interpolator component to the front end component which correspond to object read commands issued by the front end component;

outputting a second signal from the interpolator component to the front end component indicating when a valid object has been returned by the interpolator component to the front end component; and analyzing the first and second signals in the front end component to determine the number of object commands issued by the front end component and the number of objects returned to the front end component, wherein once all of the object read commands issued by the front end component have been completed, objects found in the front end component after the end command was received by the front end component are discarded.

* * * * *